United States Patent [19]

Maram

[11] Patent Number: 5,019,803

[45] Date of Patent: May 28, 1991

[54] DETECTOR UNITS

[76] Inventor: Morris Maram, 135 President Street, Johannesburg 2001, South Africa

[21] Appl. No.: 278,775

[22] Filed: Dec. 2, 1988

[30] Foreign Application Priority Data

Dec. 2, 1987 [ZA] South Africa .................. 87/9036

[51] Int. Cl.$^5$ ................................. G08B 1/08
[52] U.S. Cl. .................................. 340/539; 340/333; 340/636; 340/693; 307/10.7
[58] Field of Search ............... 340/539, 636, 693, 333; 307/10.7; 455/127

[56] References Cited

U.S. PATENT DOCUMENTS

| 3,641,570 | 2/1972 | Thompson | 340/333 |
| 3,740,648 | 6/1973 | Grotjahn | 340/539 |
| 3,848,231 | 11/1974 | Wootton | 340/539 |
| 4,160,246 | 7/1979 | Martin et al. | |
| 4,181,842 | 1/1980 | Elias et al. | |
| 4,232,308 | 11/1980 | Lee et al. | 340/539 |
| 4,523,184 | 6/1985 | Abel | |
| 4,622,544 | 11/1986 | Bially et al. | 340/539 |
| 4,661,804 | 4/1987 | Abel | |
| 4,672,365 | 6/1987 | Gehman et al. | |

FOREIGN PATENT DOCUMENTS

| 0107390 | 5/1984 | European Pat. Off. |
| 28148851 | 9/1979 | Fed. Rep. of Germany |
| 8200594 | 3/1982 | PCT Int'l Appl. |
| 8204345 | 12/1982 | PCT Int'l Appl. |
| 1287750 | 9/1972 | United Kingdom |
| 1458263 | 12/1976 | United Kingdom |
| 1568408 | 5/1980 | United Kingdom |
| 2124002 | 2/1984 | United Kingdom |

OTHER PUBLICATIONS

J. B. Landrock et al., "Emergency Battery Charger", IBM Technical Disclosure Bulletin, vol. 26, No. 1, Jun. 1983, pp. 282, 283.

Primary Examiner—Donnie L. Crosland
Attorney, Agent, or Firm—Cushman, Darby & Cushman

[57] ABSTRACT

A detector unit for use in detecting unauthorized intrusion into homes, offices, factories and other buildings is described. The detector unit comprises a detector such as a passive infrared detector and a radio frequency transmitter that is connected to the detector and that transmits a detector signal when the detector is actuated, and battery means. Two batteries power the detector and the transmitter. A power control means is arranged so that when the power of the said first battery drops below a certain minimum the second battery is connected to the detector and the transmitter. A warning is given at the main control unit that the second battery is being used so that the user can now replace both batteries.

16 Claims, 4 Drawing Sheets

FIGURE IA

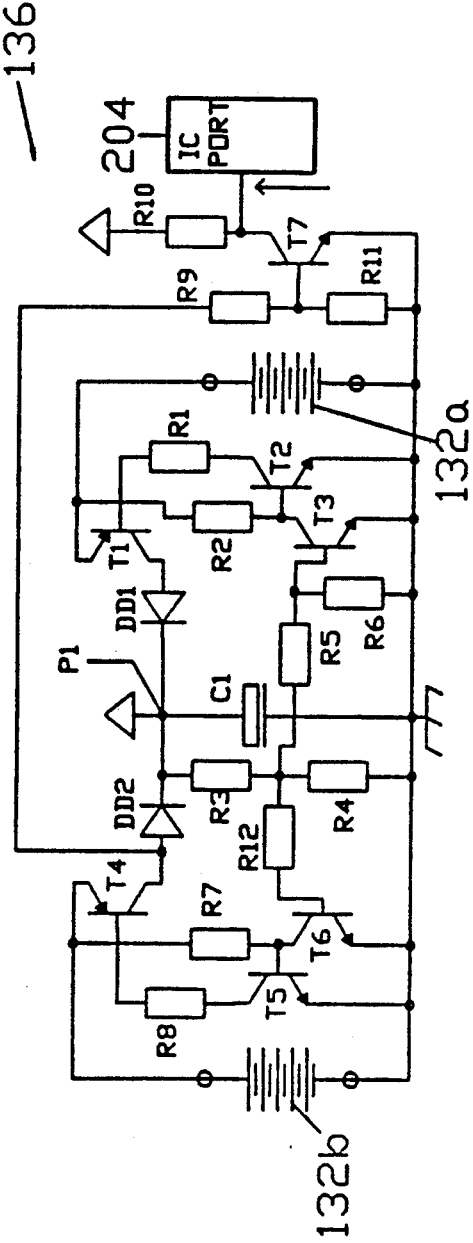
FIGURE 5
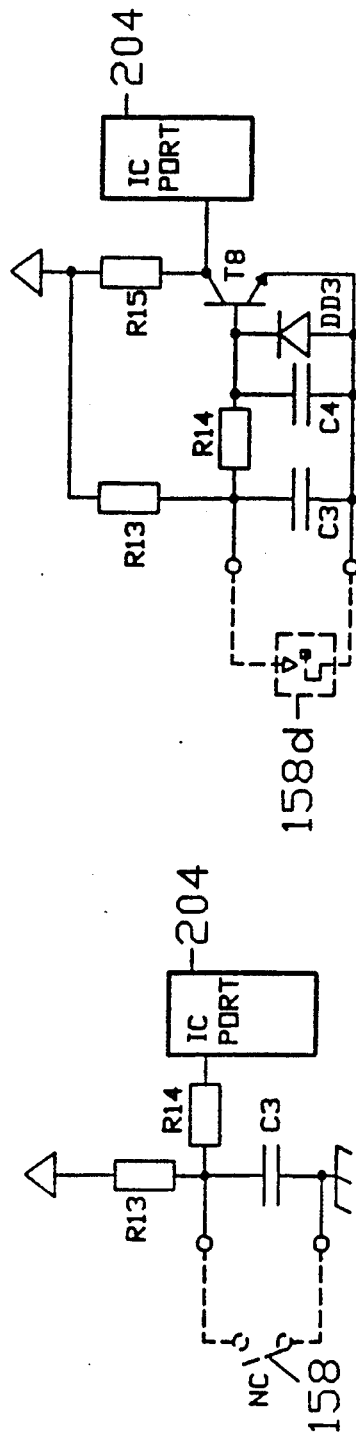
FIGURE 7
FIGURE 6

DETECTOR UNITS

This invention relates to detector units for use in detecting unauthorised intrusion into specific areas.

BACKGROUND TO THE INVENTION

Detector units for use in detecting unauthorised intrusion into homes, offices, factories and other buildings are well known. These units normally comprise a detector such as passive infrared detectors, door and window condition indicators, window trembler switches, smoke or fire detectors, window trip wires and the like and a signalling means that emits a signal (hereinafter called "a detector signal") when the detector is actuated by e.g. detecting an untoward occurrence. The detectors are connected to a main station control unit which when it receives a detection signal actuates an alarm or similar device that indicates an untoward occurrence (hereinafter called "a fault") which has caused the detector to emit its detector signal.

Many if not most of these detectors are normally connected by wire connectors to the main station control unit. The detector also receives the power for its operation by wire connectors from the main control units. Thus the installation of the detector unit is a skilled operation requiring skilled workers to prepare the installation. Further, once the detector unit is installed, it is difficult to reposition without causing damage to the wall or other part on which it is mounted and along which the wires run. It has been proposed that the signalling means should be a battery driven radio frequency transmitter which avoids many of the problems mentioned above. However such detector units have not been widely accepted due inter alia to the fact that when the battery loses power, the zones covered by the detector units are often unsurveyed.

In practice with protection devices of acceptably moderate cost, the main control unit will have only a limited number of input lines or radio channels to it so that a number of detector units will be connected to the main control unit through common lines. These detector units will normally be arranged to protect a single zone—for example one floor in an apartment building, the sleeping quarters in a house, the store room in a factory. The main control unit will thus be able to indicate that a detector signal has been given from a zone but will not identify which detector unit in the zone has emitted the detector signal. Consequently the user will only be able to ascertain from the main control unit the zone where the untoward occurrence took place without knowing in detail where this has occurred.

An object of the invention is to provide a detection unit which is capable of overcoming one or more of the foregoing disadvantages.

SHORT DESCRIPTION OF INVENTION

According to one aspect of the invention there is provided a detector unit comprising a detector, a signalling means in the form of a radio frequency transmitter that is connected to the detector and that transmits a detector signal when the detector is actuated and battery means to power the detector and the transmitter characterised in that the battery means comprises two batteries cells of which a first only is normally connected to the detector and the transmitter, power control means actuable when the power of the said first battery drops below a certain minimum to connect the second battery to the detector and the transmitter.

Conveniently warning indicator means, such as a light, is provided which is operated when the said second battery is connected to the detector and the transmitter. The power control means may further operate the transmitter to give a signal (hereinafter called the "PCM signal"), which is preferably different from the detector signal, that is receivable by the main control unit so that the latter can provide an indication that the power of the said first cell drops below the aforesaid minimum. This indication may be given by a light emitting diode (being one of a series), a signal on a display device, an audio signal or other signal that identifies the particular unit in which the said first battery has run down.

There is preferably also provided a battery life enhancing means (hereinafter called a "BLEM") to limit the amount of time that the unit is operating. The BLEM may comprise a light sensitive means to deactivate the unit when it detects a certain amount of light e.g. during day time or during such times as the normal lights in the space being protected are illuminated. An override switch may be provided to override the action of the light sensitive means. Further or alternatively the BLEM may comprise a timer to control the length (in time) of any detector signal emitted by the transmitter and or to prevent operation of the detector unit for a period e.g. during which the transmitter is emitting a detector signal or during a period after such signal has been emitted.

The invention provides in accordance with a further aspect the combination of a main control unit (hereinafter called a "MCU") and a plurality of detector units as set out above, the MCU being adapted to provide a signal when it receives a detector signal from a transmitter of a detector unit.

The detector may be any detector such as one that is used for space or unit protection. Thus it may be a passive infrared detector, a sonic detector, a microswitch, a vibrator window switch, a smoke detector, a door switch, a tamper switch (which detects any attempt to tamper with the detector unit), a pressure pad switch (which would be mounted under an item of equipment it is desired to protect to detect if it had been lifted), a remote key switch or the like. The detector may also be a monitoring device to monitor temperature, humidity, pressure, radiation etc. Further it may monitor when a particular item e.g. an identifying transmitter is in its proximity.

The detector unit may further comprise a solar cell and the battery cell(s) is(are) rechargable, the solar cell serving to provide a trickle charge for the battery cell(s). The solar cell may be separate from the unit or may be incorporated in the same housing as the unit.

The detector unit may be contained within a housing into which is formed an emergency button. Indeed the housing may comprise a cover which constitutes the said button. On depression of this button the transmitter gives off a signal (hereinafter called an "emergency signal") detectable by the MCU. The emergency signal may be the same as or different from the detector signal.

The transmitter may be set to emit any one of a large number of coded signals and the main control unit is preferably arranged to receive such coded signal. Each of the transmitters may emit a different coded detector signal and the main control unit is arranged to distinguish between such detector signals and itself to provide a different identification indicating from which control unit it received a detector signal. Such identification may be a visual or audible signal. Thus typically the MCU may give off a visual or audible signal when any one of the transmitters emits a detector signal or emergency signal and in addition it (the MCU) may give a visual display signal that identifies which of the transmitters emitted the detector signal being detected by the MCU.

The unit may comprise a sub-station which is connected to other detectors (hereinafter called "the remote detectors") by wire or similar connections. In such circumstances, the transmitter may be connected to the detector and remote detectors in such a way as to actuate it to emit different coded detector signals depending upon which detector is actuated.

The MCU is preferably connectable to mains electric power but it may be connectable also to an emergency power supply. It may be switched on by a remote unit such as a remote radio control unit. It may incorporate an audible alarm such as a siren or it may be connectable to any alarm signal means including a transmitter signalling to a receiving station such as a police station or other emergency monitoring service.

The detector units may be positioned as desired by untrained personnel or even on a "do-it-yourself" basis. To this end the housing for each detector unit may comprise an adhesive pad which can be used for adhering the housing to a wall, window, door etc.

Two embodiments of the invention will now be described by way of example with reference to the accompanying drawings.

SHORT DESCRIPTION OF THE DRAWINGS

FIG. 1A is a block diagram of a detector unit of the invention,

Figure 8:
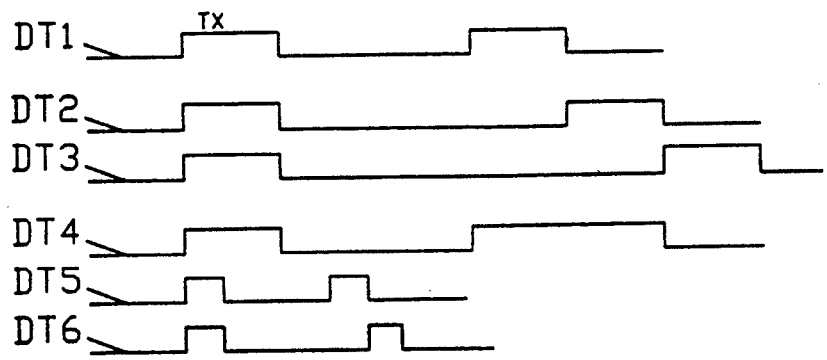
Figure 9:
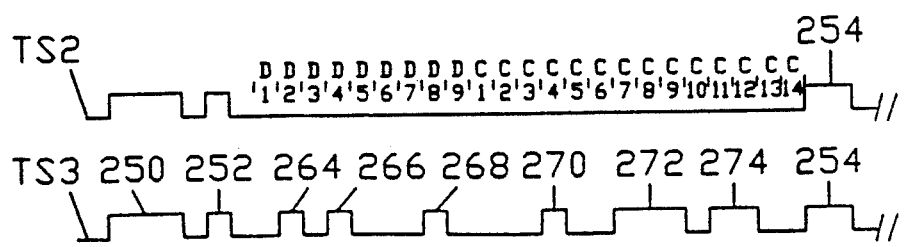
Figure 4:
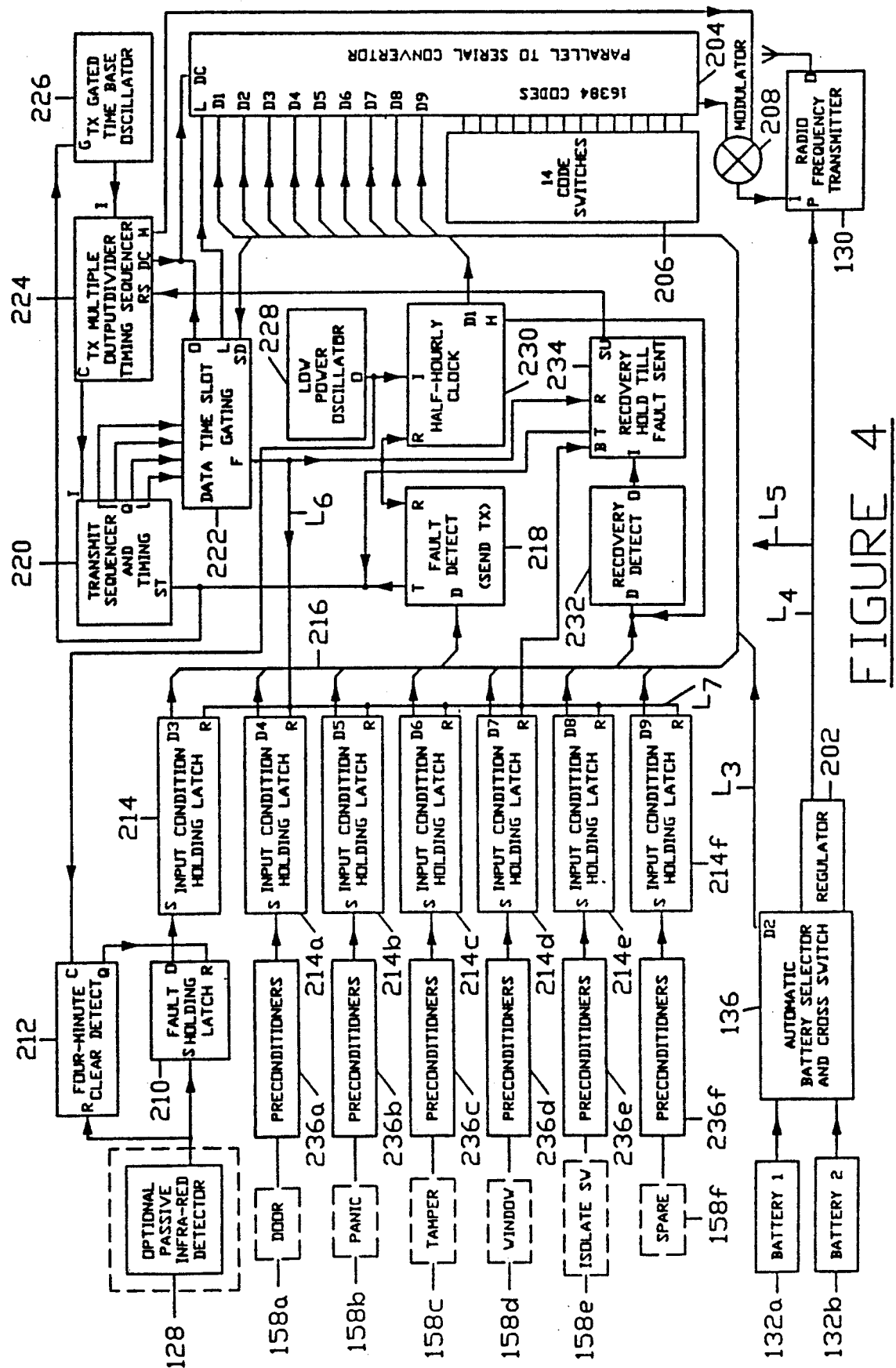

FIG. 4 is a more detailed block diagram of a another detector unit of the invention, FIG. 5 is a circuit diagram of the battery selector and cross switch circuit forming part of the detector unit of FIG. 4, FIG. 6 is a circuit diagram illustrating the input protection for the detector unit, FIG. 7 is a circuit diagram illustration a conditioner for a window protection vibrator, FIG. 8 is a graph showing the timing of various detector signals, and FIG. 9 is an enlarged detail of FIG. 8.

DESCRIPTION OF THE FIRST EMBODIMENT

Figure 1:
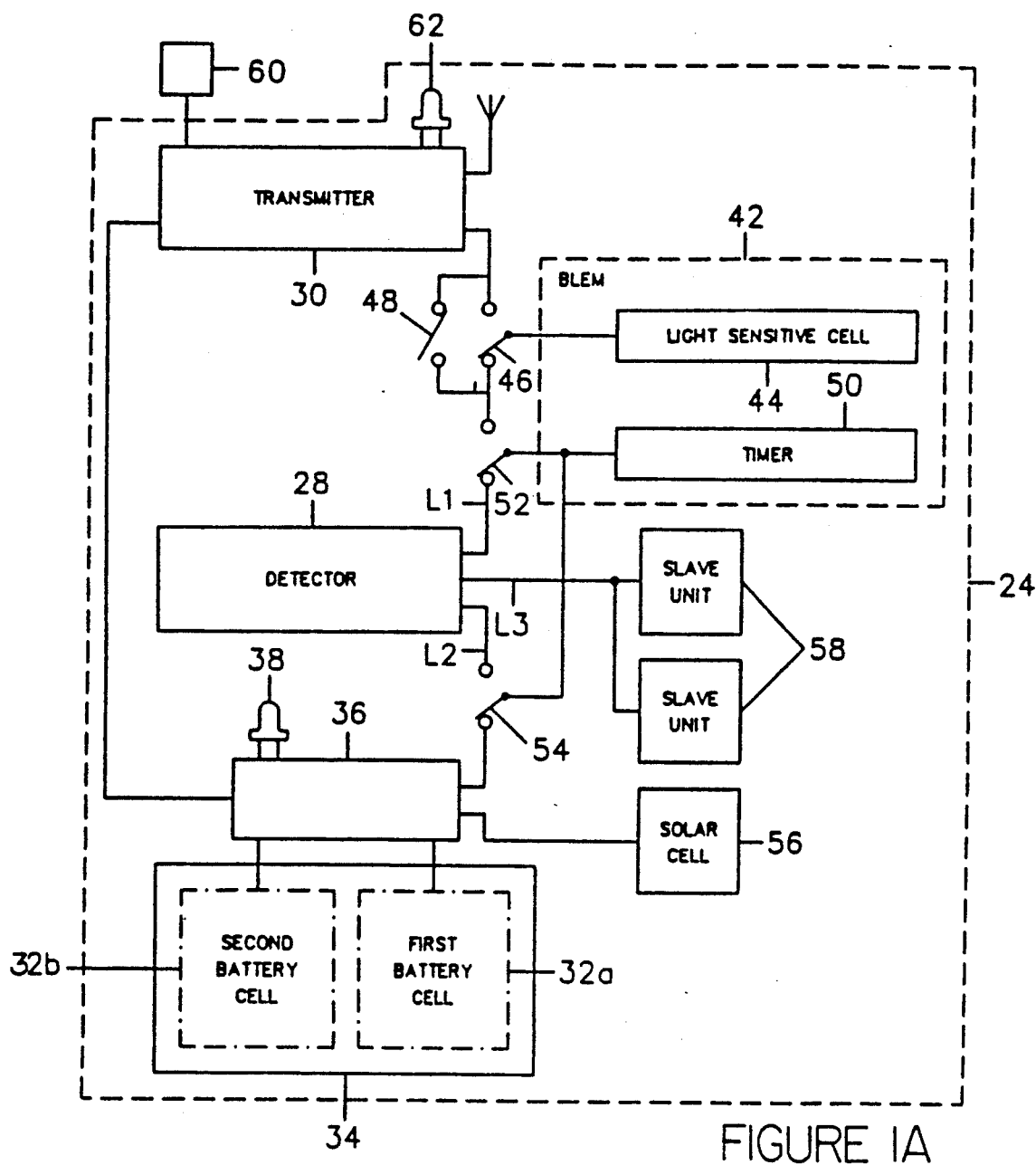
FIG. 1 is a block diagram of an alarm system of the invention.
Figure 1:
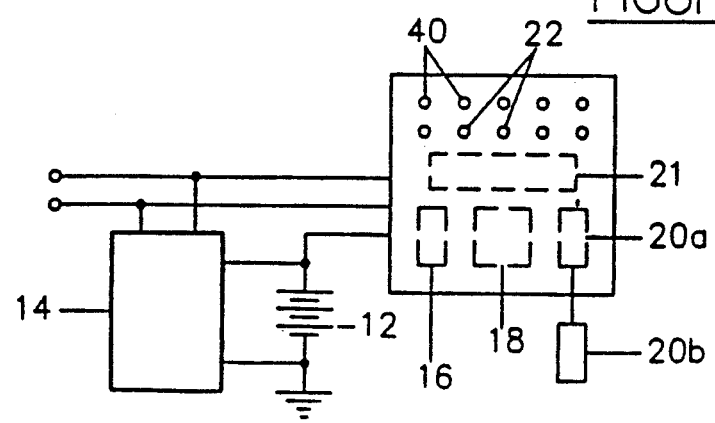
Figure 2:
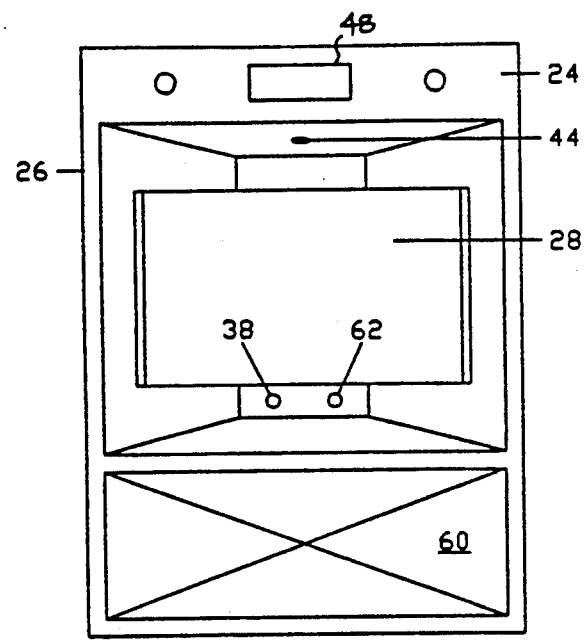
FIG. 2 is a front view of a detector unit of the invention.
Figure 3:
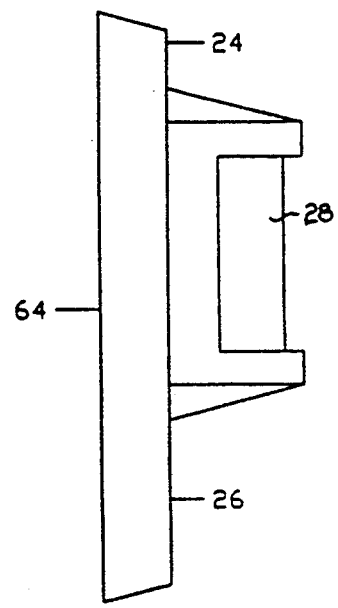
FIG. 3 is a side view of the detector unit.

Referring now to FIGS. 1 to 3, there is shown an alarm system of the invention. The system comprises a main control unit (MCU) 10 located in e.g. a kitchen and connected to a source of mains electrical power and to an emergency battery 12 which comes into operation should the mains power be interrupted. A trickle charger 14 is connected to the emergency battery 12 to maintain it charged at all times. The MCU 10 includes a receiver 16 to receive any one of a number of encoded signals, an actuator 18, an internal siren 20a, an external audible alarm emitter 20b and a display device including an alpha-numeric read out display board 21 and a series of identified LED's 22. The actuator 18 is operable by the receiver 16 when it receives a detector signal (to be discussed below) to actuate one or both of the sirens 20 or to send a signal to a remote emergency monitoring service such as a police station. The LEDs 22 will indicate that a particular signal has been received (as will be discussed more fully below) and further details are obtained from the display. To this end, an operating button (not shown) is provided on the MCU 10 to interrogate which function has been actioned.

The alarm system further comprises a number of detector units 24 (only one of which is shown). Each detector unit 24 comprises a housing 26 (see FIGS. 2 and 3) within which is a passive infrared detector ("PIRD") indicated at 28, a radio signal transmitter 30 capable of giving off an encoded signal (the detector signal) and a pair of battery cells 32 carried by a battery carrier 34. The PIRD 28 is connected to the transmitter 30 by a line $L_1$ and to the battery carrier 34 by a line $L_2$.

The carrier 34 connects one of the battery cells 32a to the PIRD 28. It incorporates a battery selector and cross switch circuit 36 (the "BSCS circuit") to detect when the voltage of the said one of the cells 32a has so dropped that it cannot adequately power the PIRD 28 and transmitter 30. When the circuit 36 detects this drop in voltage of the said cell 32a, it switches the connections of the carrier 34 so that the second cell 32b is also connected to the PIRD 28. A light emitting diode (LED) 38 connected to carrier 34 is at the same time supplied with power whenever a detector signal is emitted so that it, the LED 38 is then illuminated to give a visual signal that the second battery 32b is being used so that both batteries can be replaced.

Furthermore the BSCS circuit 36 is also connected to the transmitter 30 to cause it to emit a pulsed signal (the PSM signal) which is different to the detector signal and which is received by the MCU 10. The MCU 10 further comprises a number of LEDs 40 which are selectively lit when a PSM signal is received and at the same time the display 21 indicates that the PSM signal is received from a particular detector unit 24. A suitable holding circuit is provided to hold the LED 40 illuminated and the display acting as aforesaid until the circuit 36 switches back to battery 32a (when this has been replaced) and a disabling PSM signal is emitted. Thus the person in control of the area being protected will see at the MCU that there is a particular unit 24 at which the main (or first) battery 32a has run down and will therefore realise that the batteries at this unit must be replaced.

This BSCS circuit 36 is similar to that which will be described below with reference to FIG. 5.

A battery life enhancing device (BLEM) 42 is provided. This includes a light sensitive device 44 that opens a switch 46 in line $L_1$ so that only the detector (which takes very little power) will operate during the day or when the space being protected is in normal use under artificial light. To this end the device 44 is located in a place which will receive only such natural or artificial light and will normally not receive light from the action of an intruder e.g. torch light lighting. A manually operable override switch 48 is provided to override the action of the light sensitive device 44.

The BLEM 42 further comprises a timer 50. This timer 50 is connected to switches 52 and 54 in lines $L_1$ and $L_2$ respectively. The timer 50 prevents the transmitter 30 sending a signal of longer than a few seconds, i.e. sufficient to activate the MCU 10. Furthermore the timer 50 also serves do prevent operation of the PIRD 28 for a predetermined period, e.g. about four minutes, after it has been activated, thus still further reducing the power drawn from the battery.

The PIRD 28 is connected to the transmitter 30 is such a way that when it detects a source of heat emission in its path it actuates the transmitter 30 which emits a detector signal which is detected by the receiver 16 in the MCU 10. On receiving this signal the receiver 16 operates the actuator 18 sounding the sirens 20 and/or sending a signal to the remote monitoring service. It also causes the LED display 22 to indicate which unit 24 was actuated.

A solar cell 56 may optionally be provided connected to the BSCS circuit 36 to provide a trickle charge for the batteries 32.

Additional slave units 58 are provided each comprising only a detector (but no transmitter) and being connected by wires $L_3$ to a unit 24. Thus for example a number of vibrator switches on different windows of one room may be connected to a single unit 24. Or in one room, there may be a door switch, one or more vibrator switches and a manually operable emergency switch all connected to a single unit 24 containing a PIRD 28 and a transmitter 30.

A large push button 60 is provided in the housing 26 to serve as an emergency alarm switch. When depressed, the push button 60 actuates the transmitter 30 to emit an emergency signal which may be different to the detector signal. An LED 62 on the housing 26 indicates that the transmitter 30 is emitting a signal.

The rear wall 64 of the housing 26 has an adhesive layer thereon so that the housing 26 can be mounted in any convenient place in a dwelling.

It will be seen that the alarm system is a cordless system, the detector units 20 being connected to the MCU 10 by radio signals only.

The MCU 10 may be switched on and off manually or by a timer switch. Further it may be remotely switched on and off by a radio transmitter emitting an encoded radio signal. In this latter case, the MCU will be arranged to require two signals within a specific time period. This is to thwart the possible use of a remote scanner by a potential intruder endeavouring to deactivate the MCU when it should be in operation.

DESCRIPTION OF SECOND EMBODIMENT OF THE INVENTION

Reference will now be made to FIGS. 4 to 7. In the embodiment there shown, numbers similar to those used in FIGS. 1 to 3 but preceded by the prefix 100 will be used for similar parts.

As shown in FIG. 4, a detector unit 124 comprises a passive infrared detector 128 ("PIRD") and six slave detectors 158a to 158f. The unit 124 further comprises a radio frequency transmitter 130 and a battery unit carrying two batteries 132a and 132b and BSCS circuit 136 that is connected by line $L_4$ to the transmitter 130 through a regulator 202 (forming part of the battery unit 134) which maintains the power supply without loss of power unless and until the power of both batteries 132a and 132b are below a certain amount. Tapped off the line $L_4$ is a system power line $L_5$ which serves to power the detectors and other items forming part of the unit 124 requiring electrical power.

The transmitter 130 receives signals via a modulator 208 from a parallel to serial converter 204 that is connected to an encoding device 206 including fourteen manually operable code switches which yields an option of a large number of code signals (in this embodiment sixteen thousand three hundred and eighty four) that can be sent by the convertor 204 to the transmitter 130 for transmission thereby as will be described below. The convertor 204 has terminals DC, L, $D_1 \ldots D_n \ldots D_9$ to receive signals as will be described below.

The PIRD 128 is connected to a fault holding latching circuit 210 and to a four minute clear detect circuit 212. The latching circuit 210 is connected to an input condition holding latch ("ICHL") 214 which is arranged to hold the fault signal until such time as the alarm transmission has been completed. ICHL 214 is connected via a line which forms one of the lines of a data bus 216 to the convertor 204. The clear detect circuit 212 is arranged to hold the fault holding circuit 210 from sending a further signal until a period of four minutes has passed since the last signal emitted from the PIRD. The reason for this is that the PIRD 128 will send a signal whenever there is a heat movement in its zone of control which, in the event of a person moving around in the zone, would provide a confusingly large number of signals at the MCU 10. Because of the use of the clear detect circuit 212, the PIRD signals will only be sent (a) on the initial intrusion and (b) if a fault is detected after a time period of at least four minutes has lapsed since the last movement detected by the PIRD 28. Futhermore a recovery signal will be sent if there has been a clear four minutes since the last fault detected.

The said line mentioned in preceding paragraph is also connected to a fault detect unit 218 that arranges for a signal to be transmitted. This unit 218 starts a fault report by setting a sequencer and timing device 220 that provides outputs at specific time slots which are then gated with the data in a gating unit 222. This will be described more fully below. The time duration emitted from output terminal O of the gate unit 222 is gated with a gate clock 224 connected to a time base oscillator 226 and fed to the terminal DC of convertor 204. At the same time a signal containing data of the particular item that detects a fault (which as being described here is the PIRD 128) is fed to the terminal L of the convertor 204.

The gating unit 222 is also connected via line $L_6$ to a line of a bus $L_7$ which is connected to a recovery terminal R of the ICHL 214 to attempt to reset the ICHL 214 if no fault signal is being emitted by the PIRD 128.

A low power oscillator 228 supplies timed pulses to the four minute clear detect circuit 212 and also to a half hour clock 230 that is connected to terminal $D_1$ of the convertor 204 to give an identification signal every half hour so that a user will note that the detector 124 is operational even though no fault has been detected.

A recovery detect unit (RDU) 232 detects the recovery of a fault, i.e. when the signal recovers to "good" and there is no signal from output D3 of the ICHL 214 or when a signal is received from the clock 230. The RDU 232 is also connected to a recovery hold circuit (RHC) 234 to check with this before beginning a transmission sequence. The RHC 234 is connected to an aforementioned line of a bus $L_7$ which is connected to a recovery terminal R of the ICHL 214. A signal is emitted by the ICHL 214 at the terminal R when a fault becomes "no fault" (i.e. four minutes clear for PIRD and no fault signal is being emitted by the PIRD 128). This RHC 234 issues a signal to the timing sequencer 224 to indicate that recovery has taken place at the PIRD 128. The RHC 234 further includes a speed up means so that the duration of the recovery transmission is decreased.

In addition to the PIRD 128, the detector unit 124 comprises a number of sub-stations or slave units 158. In this embodiment, the slave units are a door switch 158a (which will indicate when a door in the zone being patrolled by the unit 124 is opened), a panic button 158b (which may be located on the unit 124 or at a position remote therefrom), a tamper switch 158c (which faults when an attempt is made to tamper with the unit 124), a window vibrator switch 158d, an isolate switch 158e (which is normally manually operable to isolate either the entire unit 124 or one or more of the slave units and/or the PIRD). Facilities for a spare slave unit 158f is also provided.

The slave units 158 are connected respectively to ICHLs 214a to 214f through preconditioners 236 that are used to shape and constrain the incoming signal. Two of these preconditioners will be described more fully below.

Reference is now made to FIG. 5 in which the circuit diagram of battery selector and cross switch (BSCS) circuit 136 is illustrated. Power from the main battery 132a flows through resistor R2 and tends to turn on transistor T2 which via resistor R1, turns on transistor T1. Thus the main battery power is fed via a transistor $T_1$ and diode $DD_1$ to the system at Point P, it being held at the appropriate voltage set by the ratio of the resistors $R_3$, $R_5$ and $R_6$. A capacitor $C_1$ is provided at this point to minimise oscillations. In use, the transistor T3 begins to turn on when the appropriate voltage is reached, shunting current away from transistors $T_2$ and thus T1. With a suitably high value for the resistor $R_2$, as little as two micro amps will be drawn from the main battery 132a by the regulator. The choice of the resistors $R_3$, $R_4$, $R_5$ and $R_6$ is such that the regulated voltage at P is for example about 5.1 volts. The regulator circuit for the second battery 132b is much the same as that for main battery 132a with a high value resistor $R_7$ connected to the collector of a shunt transistor $T_6$ that shunts current away from the transistors $T_5$ and thus $T_4$ when the regulated voltage at $P_1$ approaches the voltage set by the resistors $R_3$, $R_4$ and R12. This regulated voltage would be lower than the voltage present by extra divided resistors $R_5$ and $R_6$ and thus while the main regulator is regulating, the second regulator would be shut off and no current would be drawn by the system from the second battery 132b.

The second battery regulator is also connected upstream of the diode $DD_2$ to the base of transistor $T_7$ between resistors R9 and R11. The collector of the transistor $T_7$ is connected by line $L_2$ to the terminal $D_2$ of the convertor 204 which causes the transmitter 130 to send one of two signals. The first signal (which is in effect a default signal) is sent when the the second regulator is shut down, i.e. when power is being supplied by the first battery 132a and the second signal is sent when power is being supplied by the second battery 132b.

When the main battery 132a loses power, the voltage at point P/ will drop. When this is below the setting for the second regulator, then the second regulator will begin to supply power to become effective and the system from battery 132b. Thus there will an effective switch over to the second battery 132b which will now supplement or replace the main battery 132a depending upon how far the main battery has been drained.

A typical preconditioner 236 is shown in FIG. 6. This preconditioner 236 is connected to a normally closed external input 158. A capacitor $C_3$ is connected across the terminals of the input 158. The live terminal is connected through a high value resistor $R_{13}$ to the power source and via another resistor $R_{14}$ to the appropriate terminal $D_n$ of the convertor 204 through the ICHL 214 (which is not shown in FIG. 6). Thus (a) only a very low amperage is drawn by the input 234 and (b) the signal from the input is shaped and constrained thereby protecting the convertor from spikes and other high voltages.

Because the signal from a window vibrator 158d would be extremely short, a preconditioner 236d as illustrated in FIG. 7 is used. This preconditioner is similar to that disclosed in FIG. 6 but further comprises a transistor $T_8$ the base of which is connected to the resistor $R_{14}$ and to earth through an extra smoothing capacitor $C_4$ and a protective diode $DD_3$. This transistor T8 is connected to the terminal $D_7$ of the convertor 204. The transistor $T_8$ detects that there has been a signal from the vibrator 158d and increases the amplitude and period of the signal.

As mentioned above, the gate 222 arranges the operation of the transmitter 130 so that it emits data trains of varying amplitude and period. Reference is now made to FIG. 8 wherein is shown the timing diagram for such data trains. As can be seen, line DT1 indicates the data train which is emitted when the panic button and/or the tamper switch 234b and 234c detect a fault, line DT2 shows the data train emitted from the PIRD 128 and DT3 the data train emitted from a a door or window switches and DT4 the data train when both the PIRD and a door or window switch detects a fault. Line DT5 illustrates the data train for the half hourly signal and DT6 the data train for a recovery signal. It will be noted that the spacings between the pulses on the various lines differ. This is necessary not only to discriminate between the causes of the various signals but also to help prevent overlap between the signals that are emitted by different detector units. The likelihood of the signals from two detector units being emitted at the same time is small but in the unlikely event of this happening then, unless the identical inputs are faulting on both detector units, the signals will soon move out of phase and will be recognisable by the MCU.

In FIG. 9 there is shown an expansion of the status time slots. As can be seen from line TS2 the time slot comprises a start signal 250, a bit 252 and a stop bit 254. The space between the bits 252 and 254 being divided into two sections "D" and "C", the former dealing with the data signals (i.e. the signal to the appropriate terminal $D_n$ of the convertor 204 and therefore the current status) and the latter with the code introduced by the code switches 206. Thus as an example as shown on line TS3 there can be seen pulses 264, 266 and 268 in section "D" indicating respectively that the second battery 132b is being used, the door is open and the PIRD and door have been isolated. Furthermore in section "C" there are pulses 270, 272 and 274 indicating a binary code 000100011101100 i.e. decimal code 1260.

It will be seen therefore that each data train within a time slot indentifies not only the detector unit sending the signal but also the particular slave or substation that is reporting a fault. The display device on the MCU is arranged to display both such sets of information so that a person examining the display device can identify not only the zone in which an untoward event has taken place but what event took place and the precise location thereof.

It will also be seen that the battery life enhancing device ("BLEM") will be constituted by the units 212, 220, 222, 224 and 226. Because of the attributes of these parts which are discussed above, and because of the use of the high value resistors discussed above, the drain on the battery will be very low so that the life of the main battery and of the second battery will be considerable.

It will be seen that as many zones as desired can be protected by the system thus described. There will be a detector unit 124 for each zone and the zones can be quite small e.g. a room. The signals from all the detector units can be received by a single MCU. The transmitter of the detector units and the receiver of the MCU will be such that the MCU may receive the signals anywhere within the space being protected. When the space is a building containing much structural steelwork which would shield the signals, e.g. a multi story building of reinforced concrete, repeaters may be provided at suitable locations e.g. at a lift shaft so that the signals may pass to the MCU without interference.

As mentioned above, the above are cordless systems. Thus the detector units can easily be installed by relatively unskilled staff. Furthermore, the location of the detector units can be chosen for optimum operation of the units and not be constrained by the requirements of running wires to the unit.

It will also be appreciated that normally only the detector will be drawing power, the transmitter being actuated only when one of the detectors gives a fault signal or the hourly signal is being emitted. Consequently only very little power is drawn from the batteries which therefore has a very long active life in practice. Furthermore as mentioned above, the person controlling the area will have two visual signals when a first battery is no longer operating (i.e. one at the unit housing and one at the MCU). Thus the possibility of the detector unit going out of operation due to exhaustion of both batteries will be small and can only occur due to gross negligence of the person in control. This is particularly so as the life of the batteries 132 is normally of the order of nine months.

Furthermore if desired when the light detector is used, the system will be operating only when the area controlled is unlikely to be patrolled or occupied, i.e. when the light is not sufficient in the area to enable work to take place therein.

Many of the parts as described herein will not be physically separate parts but will in fact be constituted by portions of integrated circuits.

The invention is not limited to the precise constructional details hereinbefore described or illustrated in the drawings. For example different numbers of code switches may be provided, the arrangement of the status time slots and the data trains may be different. Other that possible modifications will be apparent to those skilled in the art.

Instead of the detector being a passive infrared detector, it may be any other suitable detecting device, e.g. a smoke detector, a heat detector, a door switch, etc.

In a further modification of the invention, the detector units may be of the kind which detect signals from a small personell carried transmitter (SPCT). In this arrangement, all personell (including visitors) will be obliged to carry an SPCT in a surveyed area. The MCU may be a computer which will keep track of the movements of personell carrying SPCTS both during the employment period or at any particular moment so that their whereabouts can be monitored and they can easily be reached. Thus for example messages can be passed with ease. Access to security areas can also be prevented. The detector units may control doors or locks to security areas to open, lock or shut such doors depending upon the signal given off by the SPCT. This system could also be wired instead of being cordless.

I claim:

1. A detector unit comprising:
   (a) a detector for developing a detector signal when actuated,
   (b) signalling means in the form of a radio frequency transmitter that is connected to the detector and that transmits said detector signal when the detector is actuated,
   (c) battery means for retaining a battery cell to power the detector and the transmitter, the battery means comprising
      (c.1) two battery cells connected by means to prevent current from flowing from either battery cell to the other, a first only of said battery cells being normally connected to the detector and the transmitter,
      (c.2) power control means actuable when the power of the said first cell drops below a certain minimum, and
      (c.3) switch means operated by the power control means when it is actuated to connect the second cell to the detector and the transmitter,
   (d) timing means for resetting a given time period in response to each successive detector signal, and
   (e) means connected to said detector and to said timing means for preventing a said detector signal from being emitted by said transmitter after a first time until after said timing means has received no detector signal for said given time period.

2. A detector unit as claimed in claim 1 further comprising warning indicator means which is operated when the said second cell is connected to the detector and the transmitter.

3. A detector unit as claimed in claim 2 wherein the indicator means is a light.

4. A detector unit as claimed in claim 1 wherein the power control means includes signal emission means connected to the transmitter to operate the transmitter to give a signal that is receivable by a main control unit so that the latter can provide an indication that the power of the said first cell has dropped below the aforesaid minimum.

5. A detector unit as claimed in claim 1 further comprising a battery life enhancing means (hereinafter called a "BLEM") to limit the amount of time that the unit is operating.

6. A detector unit as claimed in claim 5 wherein the BLEM comprises a light sensitive means to deactivate the unit when it detects a certain amount of light.

7. A detector unit as claimed in claim 6 further comprising an override switch provided to override the action of the light sensitive means.

8. A detector unit as claimed in claim 6 wherein the BLEM comprises a timer to control the length (in time) of any detector signal emitted by the transmitter.

9. A detector unit as claimed in claim 1 wherein the detector is selected from the group consisting of passive infrared detectors, sonic detectors, micro-switches, vibrator window switches, smoke detectors, door switches, tamper switches, pressure pad switches, and remote key switches.

10. The combination of a main control unit (hereinafter called a "MCU") and a plurality of detector units each as claimed in claim 1, the MCU comprising a receiver to receive a detector signal from a transmitter of any said detector unit and a signal emitter to emit a signal when a detector signal is received by the receiver.

11. The combination as in claim 10 wherein each detector unit includes signal emission means connected to the respective transmitter for transmitting a power drop signal indicating that the power of the respective first cell has dropped below said minimum and wherein the MCU includes means for detecting said power drop signal and providing an indication of its receipt.

12. The combination as in claim 11 wherein each detector unit has a warning indicator means which is operated when the respective second cell is connected to the respective detector and transmitter.

13. The combination of a main control unit (hereinafter called an "MCU") and a plurality of detector units, each detector unit comprising:
   (a) a detector for developing a detector signal when actuated,
   (b) signalling means in the form of a radio frequency transmitter that is connected to the detector and that transmits a detector signal when the detector is actuated, and
   (c) battery means for retaining a battery cell to power the detector and the transmitter, the battery means comprising:
      (c.1) two battery cells of which a first only is normally connected to the detector and the transmitter,
      (c.2) power control means actuable when the power of the said first cell drops below a certain minimum, and
      (c.3) switch means operated by the power control means when it is actuated to connect the second cell to the detector and the transmitter, and
   (d) signal emission means connected to the transmitter for transmitting a power drop signal to said MCU to indicate that the power of the first cell has dropped below said minimum, said MCU comprising:
   (e) means for receiving a detector signal and a power drop signal from any of said detector units,
   (f) means for indicating when a detector signal is received by the receiving means and from which of said detector units, and
   (g) means for indicating when a power drop signal is received and from which of said detector units.

14. A detector unit comprising:
a detector for developing a detector signal when actuated,
signalling means including a radio frequency transmitter connected to the detector for transmitting said detector signal when the detector is actuated,
timing means for resetting a given time period in response to each successive detector signal received, and
means connected to said detector and to said timing means for preventing a said detector signal from being emitted by said transmitter after a first time until after said timing means has received no detector signal for said given time period.

15. A detector unit comprising:
a detector for developing a detector signal when actuated,
signalling means including a radio frequency transmitter connected to the detector for transmitting said detector signal when the detector is actuated, and
means connected to said detector for preventing said detector signal from being emitted by said transmitter after a first time for at least a given period of time regardless of the number of times the detector is actuated during that time period,
wherein said preventing means includes means for holding said detector signal after once passing said detector signal to said transmitter and means responsive to said detector signal for clearing said holding signal no sooner than said given period of time.

16. A detector unit as in claim 15 wherein said clearing means is reset to said given period of time for each of the times that said detector is actuated.

* * * * *